Sept. 6, 1938. G. ROBILLARD 2,129,162
MACHINE FOR MAKING CEMENT BLOCKS AND THE LIKE
Filed Feb. 25, 1937 6 Sheets-Sheet 1
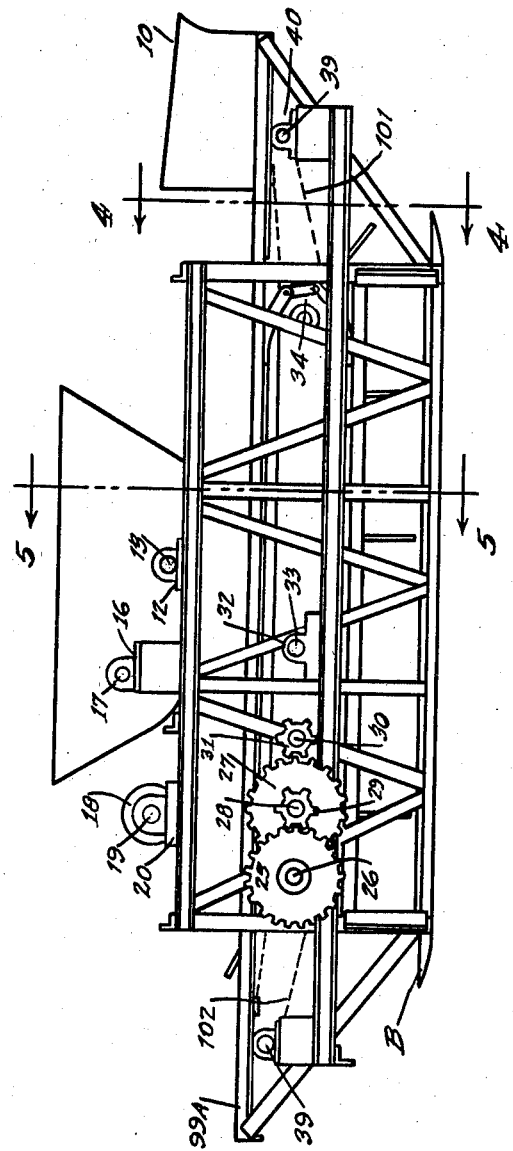
INVENTOR
G. ROBILLARD
BY
ATTORNEY.

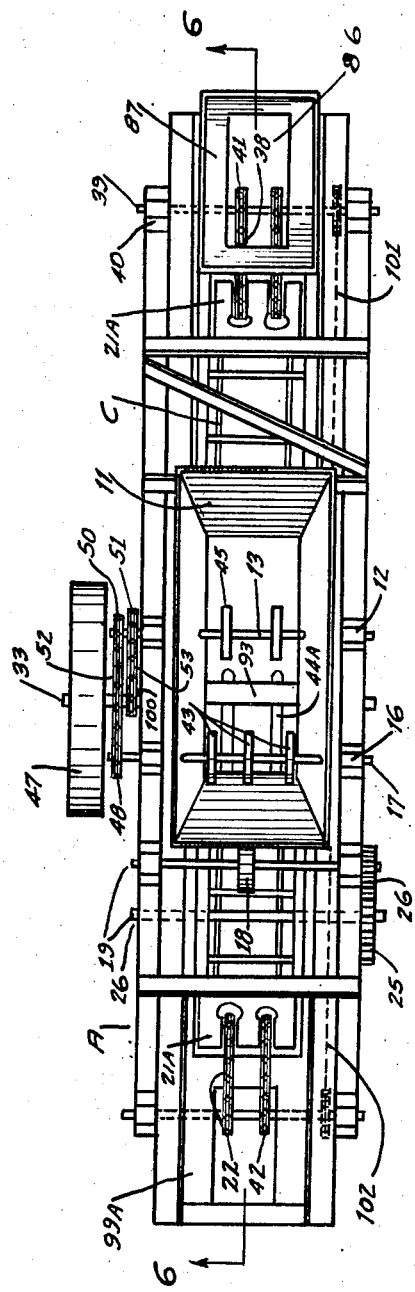

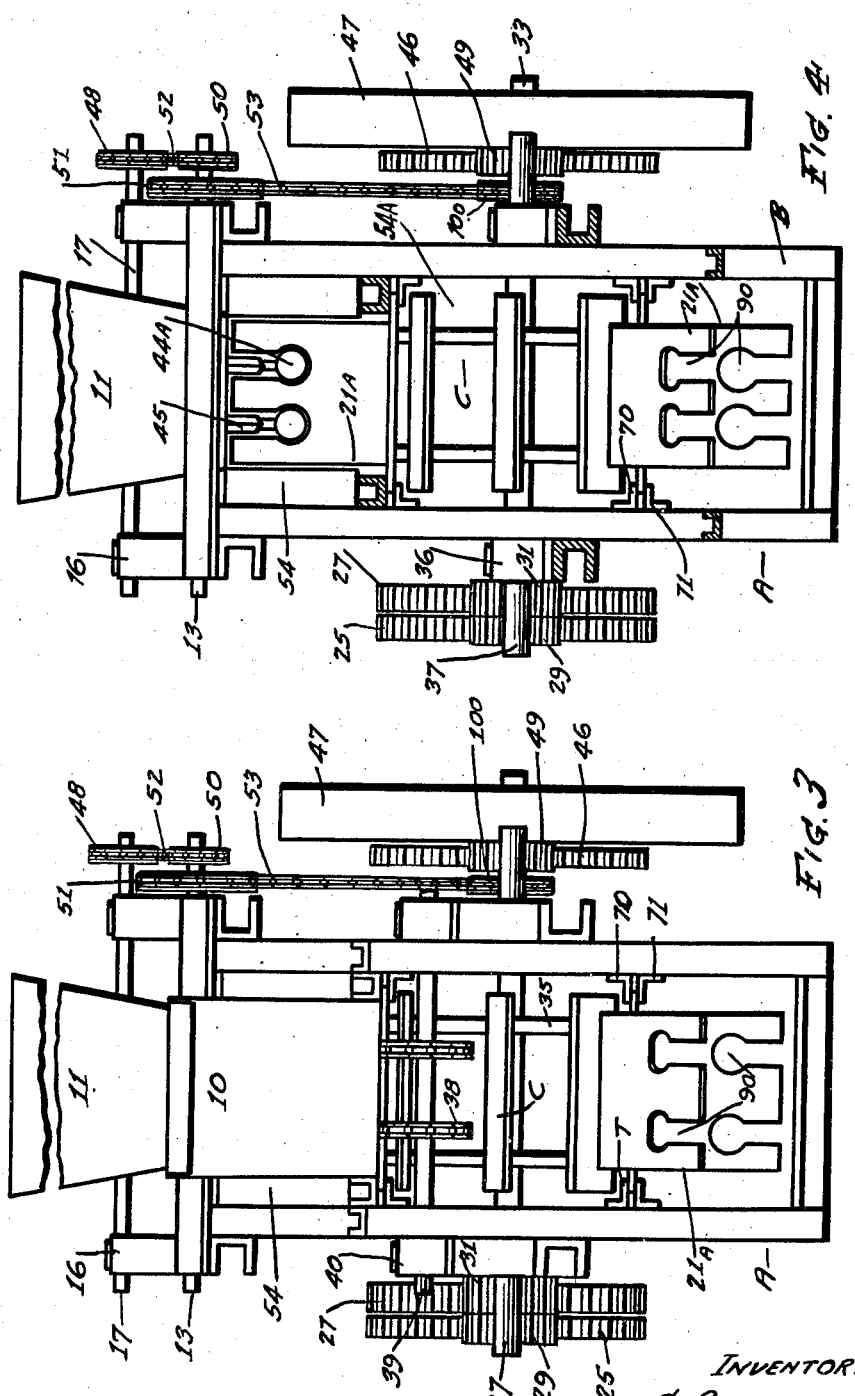

Sept. 6, 1938.   G. ROBILLARD   2,129,162
MACHINE FOR MAKING CEMENT BLOCKS AND THE LIKE
Filed Feb. 25, 1937   6 Sheets-Sheet 4

INVENTOR
G. ROBILLARD
BY Louis H. Caneau
ATTORNEY.

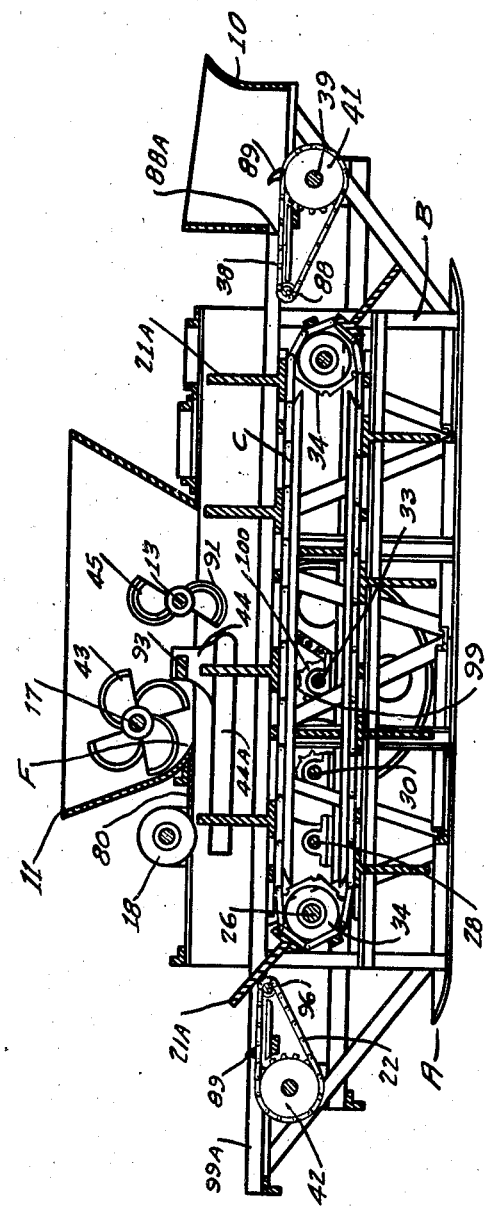

Sept. 6, 1938.　　　　G. ROBILLARD　　　　2,129,162
MACHINE FOR MAKING CEMENT BLOCKS AND THE LIKE
Filed Feb. 25, 1937　　　6 Sheets-Sheet 6
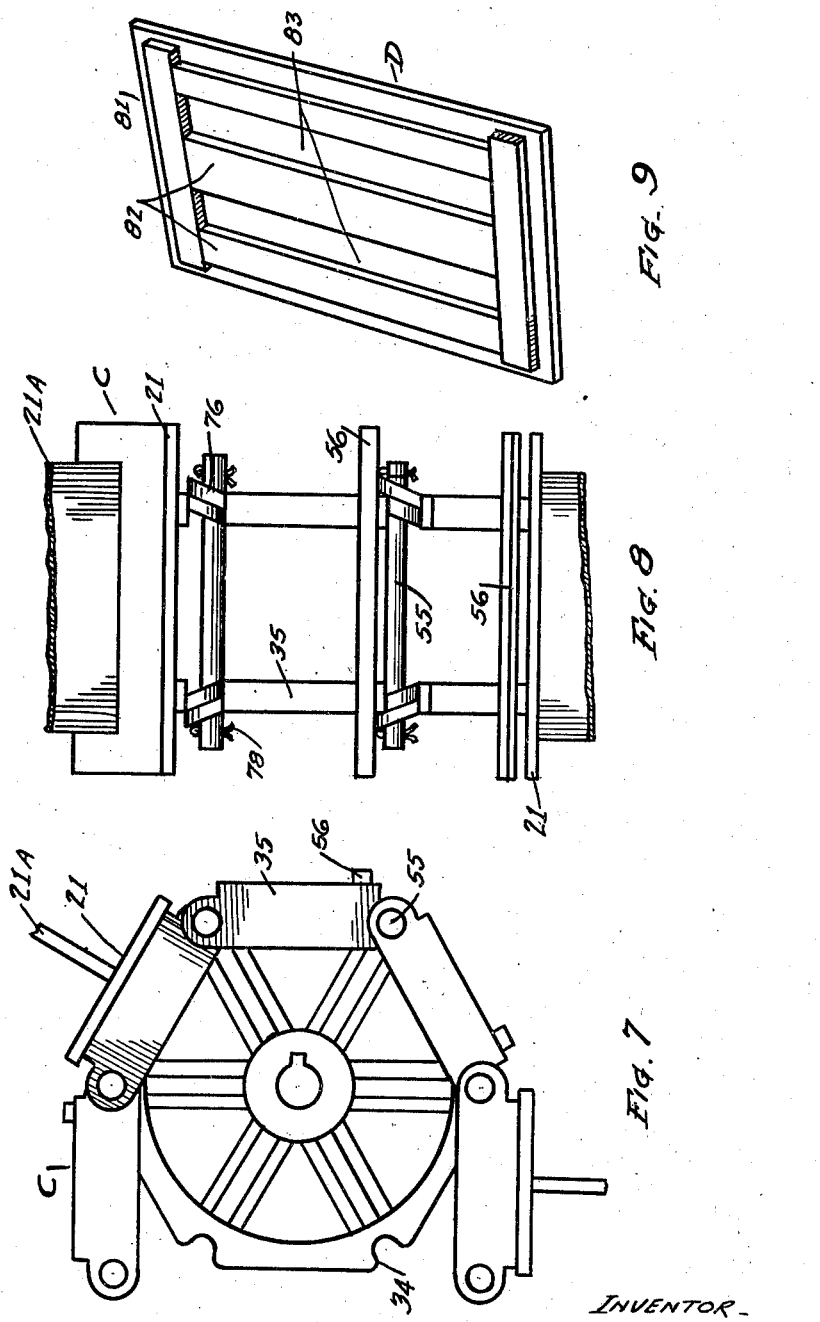

Patented Sept. 6, 1938

2,129,162

UNITED STATES PATENT OFFICE 2,129,162

MACHINE FOR MAKING CEMENT BLOCKS AND THE LIKE

Gaspard Robillard, Montreal, Quebec, Canada, assignor of one-half to Orphir Bisson, Montreal, Quebec, Canada Application February 25, 1937, Serial No. 127,723
In Canada February 27, 1936

1 Claim. (Cl. 25—99)

My invention relates to a machine for making cement blocks and the like.

The objects of my invention are to improve on known machines. More particularly, an object is to provide a continuously operating machine, and one which will successively form the blocks, hollow the same and impress a name, mark or the like upon the blocks.

Another object is to increase the production of cement blocks and accordingly reduce the cost of their production.

Another object is to design a machine so that it will be relatively simple of operation and accordingly relatively inexpensive to make, having in mind the increased output of a machine made in accordance with my invention.

Still another object is to so design the machine that it may be capable of varying the form of the walls of the block.

In the drawings, wherein like numerals of reference indicate corresponding parts in the various figures, Figure 1 is a side elevation of a machine made in accordance with my invention;

Figure 2 is a plan view of Figure 1;

Figure 3 is an end view of Figure 1 looking from right to left;

Figure 4 is a section on line 4—4 in Figure 1;

Figure 6 is a section on line 6—6 in Figure 2;

Figure 7 is an enlarged, fragmentary view of the endless chain;

Figure 8 is an end view of Figure 7;

Figure 9 is an isometric bottom view of a typical base board upon which the cement block is formed and supported.

Figure 5:
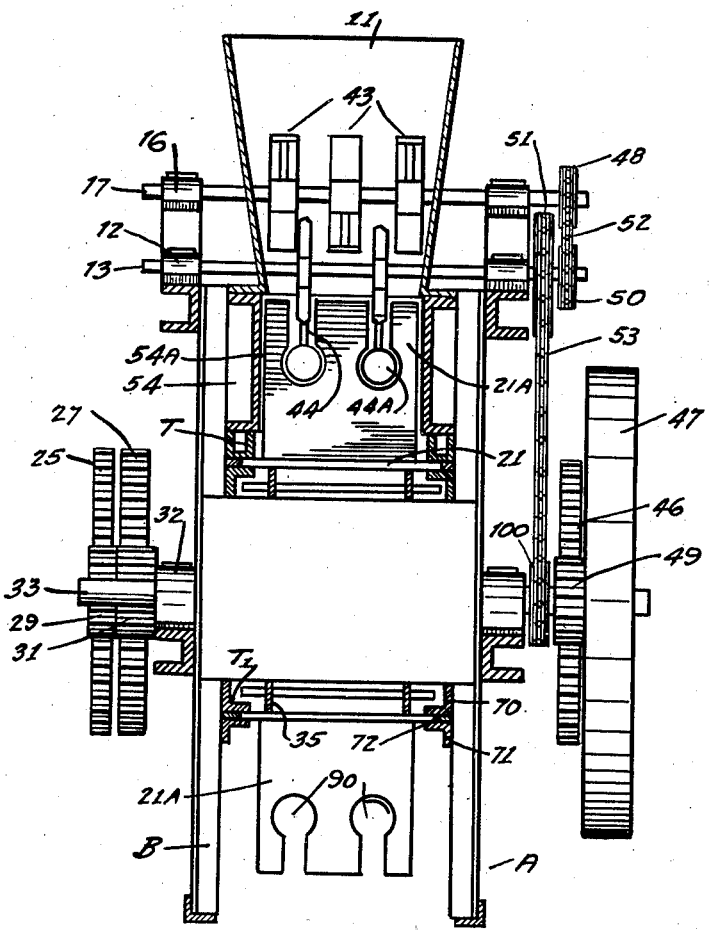
Figure 5 is a section on line 5—5 in Figure 1.

My machine provides a continuous operation of forming the blocks and of the delivering of the same out of the machine. The blocks are formed on base boards which are fed successively and preferably automatically, onto an endless chain, the boards being fed onto the chain at spaced intervals.

The machine comprises a hopper in which is stored the charge or required mixture of materials going into the manufacture of the blocks; a continuously-operating, endless chain or belt positioned to pass under the hopper; preferably, a bin in which the base boards are stacked; a track or guides for supporting the chain; means in and adjacent the chain, for defining with the base boards hollow boxes or moulds adapted to receive a charge of material from the hopper; preferably, means for feeding the base boards successively, one by one, onto the endless chain; preferably, means for stamping the block, as with a trade mark, name etc., and where the blocks are to be made hollow, as is usual, forms or gouging tools fixed to the machine in the path of the blocks; and beater elements operating to pack the material in the moulds before and after reaching the gouging tools.

Referring now by numerals to the drawings, A is the frame of the machine which may be made as shown, having two suitably braced side frames B spaced apart to provide a longitudinal passage 54A therethrough, and suitably connected or braced together. Fixed to the inside of each of the side frames B are trackways T and T1 (see Figure 5) which may be formed of members 70 and 71 having therebetween a bar 72 set inwardly from the edges of the members 70 and 71. As will be seen, these trackways serve as guides or supports for the endless chain.

The endless chain, shown at C, is trained around sprockets 34 journalled adjacent each end of the frame A. The chain may be made as best shown in Figures 7 and 8. Thus, links 35 have their ends of reduced thickness and slightly bent in opposite directions as at 75 and 76, these ends being perforated to receive hinge or connecting pins 55 which may be held in the links by cotters 78. Every third pair of links is formed with a joining flat base plate 21. The pairs of links disposed between adjacent plates 21 may be provided with cross members or braces 56. The plates 21 and braces 56 are preferably of the same length or otherwise laterally project equally on each side of the links, and slidably engage in the trackways T and T2, as the case may be. The endless chain is thus supported in the trackways by the laterally projecting plates 21 and braces 56. The endless chain may be actuated by one of the sprockets 34, or by both, the teeth or notches in the sprockets being suitably spaced to receive the pins 55 of the endless chain. From each plate 21 of the endless chain projects at right angles thereto, a wall or partition 21A, this wall being disposed equidistantly between the forward and rearward edges of the plate 21 and extending partly across, as best shown in Figures 7 and 8. The walls 21A are spaced apart, longitudinally of the chain, to receive therebetween, a base board D (shown in Figure 9), the base board resting at its ends on two adjacent joining plates 21.

11 is the hopper, in which is stored the charge or mixture of materials going into the manufacture of the blocks. The hopper is open at the bottom, and between the bottom of the hopper and the trackways T, and extending along the bottom opening and some distance beyond, are two side walls or partitions 54 (see Figure 5). The inside surfaces of these walls are preferably flush with the inside surfaces of the side walls of the hopper (see Figure 5). The partitions 21A of the joining plates 21 in the endless chain, are slightly less in length (as measured across the length of the chain) than the distance between the walls 54 under the hopper, so that the chain may operate easily through the machine or longitudinal passage 54A, while not leaving any appreciable space or clearance between the end edges of the partitions and the walls 54. Thus, the walls 54 define with the base board D (upon which the block is formed) and two adjacent partitions 21A of the chain, a hollow compartment or mould closed on all sides and bottom but open at the top, into which material from the hopper falls. Preferably, as shown in Figure 6, plates 80 are provided at each end of the hopper, flush with the plane of the bottom opening of the hopper and extending across the longitudinal channel 54A. Preferably, as best shown in Figure 6, the rear wall of the hopper is curved as at F to provide a relatively sharp edge.

The base board D may be made as shown in Figure 9, comprising one or more pieces of wood 81 arranged to form a flat top face and slats 82 on the underside, a number of which are laid lengthwise of the board and spaced to provide recesses 83. The boards or members D are stacked in a bin 10 on the forward end of the machine, the boards being disposed with their flat or even faces lying uppermost, that is, with the recessed faces lying lowermost. The bin has its bottom wall partly open as at 86 (see Figure 2) to provide a passage for endless chains 38, and to provide also ledges 87 for the support of the stack of boards. The endless chains 38 are trained around cog-wheels 41 and idlers 88, the wheels 41 being fixed on a transverse shaft 39 journalled in suitable bearings 40. The chains 38 operate to feed the base boards in the bin 10, onto the endless chain C. Thus, fingers 89 may be secured to the chains 38, adapted to engage the underside of the then lowermost base board in the bin 10, more particularly engage the edge of one of the slats 82 and drag the board toward the endless chain C. The speed of the feed chains 38 must be greater than that of the chain C so that the board ejected out of the bin will overtake or about overtake the wall 21A of the chain just as the wall has reached a vertical position, in transit toward the hopper 11. When the board has overtaken this wall 21A of the chain, when the feed chain 38 lets go of the board, the next following wall 21A of the chain will now engage or about engage the rear edge of the board, to lift or otherwise shift the same forwardly, until it finally lies in operative and horizontal position between the two adjacent, now vertical, walls 21A.

The walls 21A of the chain are slotted or open as at 90, primarily for purposes to be clearly seen presently. The feed chains 38 are conveniently disposed to lie within the plane of travel of the slots, this permitting of the placing of the idlers 88 very near to the chain C.

As previously stated, two adjacent walls 21A of the endless, continuously-travelling chain C, form with the side walls 54 and the base board D lying upon the chain, between the two adjacent walls 21A, an open-top compartment or mould adapted to receive a charge of material from the hopper 11; when the forward one of these two walls 21A reaches and passes under the hopper, material will begin to fall into the mould, and the mould will be filled when the mould is fully under the hopper. As the mould continues on its travel towards the delivery end of the machine, the load or charge in the mould undergoes a packing process under the influence of a beater or packing element 45. The beater or beaters, may be in the form of more or less spirally-formed faces 91, of angular cross section, (see Figures 5 and 6), fixed on a transverse shaft 13 journalled in bearings 12 (see Figure 1). The beaters revolve in an anti-clockwise direction as seen in Figure 6. The action of these beater elements is to pack the material into the mould, downwardly and somewhat laterally.

Fixed in the longitudinal channel 54 traversed by the chain C, are longitudinally-arranged forming or gouging tools or dies 44A having at the forward end thereof, longitudinally-arranged thin webs or brackets 44 secured to a cross beam or member 93 mounted at its ends to the side frames of the machine. These tools are circular in cross section to correspond to the diameter of the hollow spaces or chambers to be formed in the finished block. The tools are spaced to pass through the slots 90 aforesaid formed in the walls 21A of the chain C. As the load or charge of material in the mould is carried forwardly with and by the chain C, against the fixed tools 44A, so much of the material in the mould is displaced. When the mould has still further advanced in its travel toward the delivery end of the machine, the material undergoes a second packing or beating process, under the influence of a second set of beaters 43 fixed on a transverse shaft 17 journalled in bearings 16. This beater element may be formed substantially as the beater 45, but preferably has twice as many beating or packing surfaces and is positioned at a higher level than the beaters 45. This second set of beaters is provided mostly for the purpose of filling in the empty spaces or grooves formed by the webs 44, of the gouging tools.

Preferably, a drum or circular member 18 is fixed on a transverse shaft 19 journalled in bearings 20, this drum being positioned in the path of the block and having on its periphery, raised letters, numerals or other characters whereby the same may be impressed into the upper face of the block for identification purposes. Thus, while the block is still in movement, before its delivery out of the machine, a trade-mark, name or the like may be conveniently stamped or impressed into, or otherwise applied to, the block.

At the delivery end of the machine, is an endless delivery chain 22 trained around a sprocket 42 and an idler 96. The chains 22 are spaced to lie in the plane of the slots 90 in the walls 21A of the chain C, so that the idlers may be positioned near to the chain C. The chain may carry hooks or fingers 97 similar to those on the feed chain 38 at the opposite end of the machine, whereby the board, with a block thereon, will be slid upon the delivery platform 99A of the machine.

Any suitable driving mechanism may be provided, as shown. For instance, 47 is a pulley fixed on a transverse shaft 33 journalled in bearings 32. Fixed to the shaft 33 is a gear 49 meshing with a larger gear 46 fixed to a shaft 30 journalled in bearings 99. Fixed to the shaft 33 is a sprocket 100. Trained around this sprocket 100 and a sprocket 51 fixed on the shaft 13, is a chain 53. Fixed to the shafts 13 and 17, are sprockets 50 and 48, respectively around which is trained a chain 52. Both shafts 17 and 13 will therefore be rotated simultaneously from and by the pulley 47.

Fixed to the shaft 30, on the end opposite that of the pulley 47, is a gear 31 meshing with a larger gear 27 fixed to a transverse shaft 28. Fixed to this shaft 28 is a second gear 29 meshing with a larger gear 25 fixed to a transverse shaft 26. Fixed to this shaft 26 are the sprockets 34 of the forward end of the chain C. The chain C is thus actuated by and from the pulley 47.

Fixed to the shaft 37 to which are fixed the sprockets 34 of the rear end of the chain C, is a sprocket (not shown) and between this sprocket and another sprocket (not shown) fixed to the shaft 39 of the feed chain 38, is a chain 101. The feed chain 38 is thus actuated from and by the pulley 47. Similarly, trained around a sprocket (not shown) fixed to the shaft 26 and a sprocket (not shown) fixed to the shaft 23 mounting the sprockets 42 of the delivery chain 22, is a chain 102. Thus, the delivery chain 22 will be actuated by and from the pulley 47.

It may be stated that the walls 54 may be used to impress a variety of designs to the side, longitudinal walls of the block, as say with grooves, merely by forming the walls with raised, longitudinal portions or bands arranged parallelly with the track T. In that event, the walls 21A would accordingly be notched along their end edges to provide clearances for the raised portions in the walls 54.

Operation

The feed chain 38, the main chain C, the delivery chain 22, the stamping drum 18, and both beaters 43 and 45 are actuated simultaneously. The feed chain 38 operates to shift the lowermost of the baseboards D in the bin 10 onto the main chain C and between two adjacent partitions 21A of the chain. As the main chain moves toward the delivery end of the machine, the base board, or more particularly the mould which it forms, reaches a position to be filled by the material in the hopper. While travelling, the material in the mould first comes under the action of the first beater or beaters 45; it is next forced against the gouging tool or tools 44A whereby a hollow or hollows, is formed, while the material next comes under the action of the second beater or beaters 43. This beater further packs the material in the mould and the groove formed by the web 44 is completely and adequately filled or obliterated. The block is then stamped with the mark or the like by means of the drum 18. The mould finally reaches the end of its travel toward the delivery end of the machine, when the delivery chain operates to slide the base board, with formed block thereon, onto the delivery platform 99A. The block is next lifted off the platform and carried away and deposited to dry.

What I claim is:—

In a machine for making hollow blocks of cement or other material, the combination of a frame, an endless chain, spaced transverse partitions mounted on said chain, a hopper mounted above said chain having a bottom discharge opening, side walls fixed to said frame and extending between said hopper and said chain, said chain being adapted to receive between consecutive partitions loose flat members forming with said partitions and side walls open-topped moulds adapted to receive material from said hopper, a longitudinally-arranged gouging tool in the path of said partitions adapted to hollow the blocks, a plate depending from said frame suspending said tool from the top, a beater element within said hopper operating to pack the material in the mould in advance of said gouging tool, a second beater element within said hopper operating to pack the material into the groove formed in the block by said depending plate, after the block is out of the field of said tool, and means for operating said chain and beater elements simultaneously, said partitions being formed with openings in register with said gouging tool and depending plate to permit of the free passage of said partitions past said gouging tool and plate.

GASPARD ROBILLARD.